United States Patent
Wen

(10) Patent No.: US 11,080,427 B2
(45) Date of Patent: Aug. 3, 2021

(54) METHOD AND APPARATUS FOR DETECTING LABEL DATA LEAKAGE CHANNEL

(71) Applicant: ALIBABA GROUP HOLDING LIMITED, George Town (KY)

(72) Inventor: Zhen Wen, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 16/874,012

(22) Filed: May 14, 2020

(65) Prior Publication Data

US 2020/0272765 A1 Aug. 27, 2020

Related U.S. Application Data

(63) Continuation of application No. 16/020,872, filed on Jun. 27, 2018, now Pat. No. 10,678,946, which is a (Continued)

(30) Foreign Application Priority Data

Dec. 31, 2015 (CN) .......................... 201511028180.5

(51) Int. Cl.
*G06F 21/62* (2013.01)
*H04L 12/26* (2006.01)

(52) U.S. Cl.
CPC ...... *G06F 21/6272* (2013.01); *G06F 21/6245* (2013.01); *H04L 43/12* (2013.01)

(58) Field of Classification Search
CPC ............ G06F 21/6272; G06F 21/6263; H04W 12/1002
See application file for complete search history.

(56) References Cited

U.S. PATENT DOCUMENTS 7,668,821 B1 * 2/2010 Donsbach ........... G06F 16/9535
707/765
9,256,727 B1 * 2/2016 Manmohan ............. G06F 21/60
(Continued)

FOREIGN PATENT DOCUMENTS

CN 103237018 A 8/2013
CN 103281403 A 9/2013
(Continued)

OTHER PUBLICATIONS

Chinese Search Report issued in corresponding Chinese Application No. 2015110281805, dated Nov. 19, 2019 (2 pgs.).
(Continued)

*Primary Examiner* — Ponnoreay Pich
(74) *Attorney, Agent, or Firm* — Finnegan, Henderson, Farabow, Garrett & Dunner, LLP

(57) ABSTRACT

The present disclosure provides label data leakage channel detection methods and apparatuses. According to one exemplary label data leakage channel detection method, detection labels are generated based on normal labels of a user. The detection labels can be associated with different data usage channels, so as to indirectly detect usage of the detection labels. Possible data leakage channels can be effectively detected based on massive data indexing and searching. One exemplary apparatus of the present disclosure includes a detection label adding module, a channel association module, an interception module, an intercepted information analysis module, a channel searching module, and an output module. The detection methods and apparatuses provided by the present disclosure have the advantages of high detection efficiency and the capability of processing massive and dynamic user label data.

18 Claims, 2 Drawing Sheets

Related U.S. Application Data continuation of application No. PCT/CN2016/110714, filed on Dec. 19, 2016.

(56) References Cited

U.S. PATENT DOCUMENTS

| | | | | |
|---|---|---|---|---|
| 9,349,015 | B1* | 5/2016 | Archer | G06F 21/62 |
| 2005/0125683 | A1* | 6/2005 | Matsuyama | G06F 21/33 |
| | | | | 713/189 |
| 2012/0137375 | A1* | 5/2012 | Ramachandran | G06F 21/6218 |
| | | | | 726/28 |
| 2013/0124583 | A1* | 5/2013 | Ferguson | G06Q 10/00 |
| | | | | 707/821 |
| 2015/0029869 | A1* | 1/2015 | Wolcott | H04B 3/487 |
| | | | | 370/242 |
| 2015/0082426 | A1* | 3/2015 | Palan | H04L 63/1466 |
| | | | | 726/22 |
| 2016/0373447 | A1 | 12/2016 | Akiyama et al. | |
| 2018/0314856 | A1* | 11/2018 | Wen | G06F 21/6245 |
| 2020/0272765 | A1* | 8/2020 | Wen | G06F 21/6272 |

FOREIGN PATENT DOCUMENTS

| | | |
|---|---|---|
| CN | 103581190 A | 2/2014 |
| CN | 103581883 A | 2/2014 |
| CN | 103593465 A | 2/2014 |
| CN | 103870000 A | 6/2014 |
| CN | 104133837 A | 11/2014 |
| CN | 104778419 A | 7/2015 |
| CN | 104965890 A | 10/2015 |
| JP | 2005-222135 A | 8/2005 |
| JP | 2012-150652 A | 8/2012 |
| JP | 2013-164739 A | 8/2013 |
| JP | 2015-176263 A | 10/2015 |
| WO | WO2014/024959 A1 | 2/2014 |
| WO | WO2015/001969 | 1/2015 |
| WO | WO 2015/030856 A1 | 3/2015 |
| WO | WO 2017/114209 A1 | 7/2017 |

OTHER PUBLICATIONS

Notice of Reasons for Refusal issued by Japanese Patent Office in corresponding Japanese Application No. 2018532787, dated Feb. 2, 2021 (8 pgs.).

Search Report issued by Japaness Patent Office in corresponding Japanese Application No. 2018532787, dated Jan. 27, 2021 (37 pgs.).

* cited by examiner

METHOD AND APPARATUS FOR DETECTING LABEL DATA LEAKAGE CHANNEL

This application is a continuation of application Ser. No. 16/020,872, filed Jun. 27, 2018, which claims priority to International Application No. PCT/CN2016/110714, filed on Dec. 19, 2016, which claims priority to and the benefits of priority to Chinese Application No. 201511028180.5, filed on Dec. 31, 2015. The contents of these applications are incorporated herein by reference in their entireties.

TECHNICAL FIELD

The present disclosure relates to data security technologies, and in particular, to label data leakage channel detection methods and apparatuses.

BACKGROUND

Labeling is a form of internet content organization. It refers to a keyword strongly related to properties of an object or entity. Labels can help describe and categorize contents, facilitating content retrieval and sharing. With the use and development of the Internet, a large amount of user preference data has accumulated in the form of labels. Such data forms the basis of internet advertising, referrals, and other services and products. On the other hand, given its value, such data has become the target of data leakage, along with other personally identifiable information (PII) of users. The label data is sometimes obtained and resold illegally. Existing data security technologies use encryption, system reinforcement, access control, and audit monitoring to prevent data from leaking out of a controllable environment of a data owner. However, in scenarios involving data cooperation, data usually leaves the controllable environment of the data owner and enters an uncontrollable partner environment. In such scenarios, conventional database watermarking technology and data trajectory tracking technology are not able to address the challenges posed by massive and dynamic user label data.

Conventional database watermarking technology and conventional data trajectory tracking technology cannot produce effective watermarks for user labels, partly because user labels do not include numeric fields. Further, label data is generally used in a dispersed manner, making it difficult to detect watermarks. In addition, because label data is of a massive amount and it is dynamic, it poses special challenges for the updating and detection of watermarks. Values associated with different labels are often the same, making it very difficult to track over the Internet.

SUMMARY

The present disclosure provides label data leakage channel detection methods and apparatuses. One objective of the present disclosure is to effectively detect possible data leakage channels, to solve the technical problem that it is difficult to track and detect label data with conventional techniques.

According to some embodiments of the present disclosure, methods for detecting label data leakage channels are provided. One exemplary method comprises: adding a detection label for a user based on one or more normal labels of the user, to generate a user label data set; assigning the detection label to a given channel based on the user label data set, and establishing a channel index associated with a user ID, a detection label and a channel ID; intercepting push information received by the user according to a probability that the push information is generated based on a normal label of the user; screening the intercepted push information according to a probability that the push information is generated based on a detection label of the user, and adding the detection label of the user to a suspected leakage label set if the probability that the push information is generated based on the detection label of the user is higher than a given threshold; searching the channel index according to the suspected leakage label set to obtain a corresponding list of suspected leakage channel IDs; detecting whether the push information is from a channel found through the search; if the push information is from a channel found through the search, deleting the corresponding channel; and outputting remaining channels as suspected leakage channels.

According to some embodiments, when adding a detection label for a user based on one or more normal labels of the user, the probability that the newly added detection label co-occurs with existing labels of the user is lower than a set threshold.

According to some embodiments, the step of assigning a detection label to a given channel according to the user label data set, and establishing a channel index associated with a user ID, a detection label and a channel ID includes: calculating a credibility value of the given channel according to historical behaviors of the given channel; selecting a HASH function from a preset HASH function set by taking a channel ID of the channel as a variable; sampling a user group based on the credibility value of the channel; for each user in the user group obtained through sampling, selecting a detection label corresponding to the channel from detection labels of the user according to the selected HASH function, with a user ID as a variable; and establishing a channel index from [user ID, detection label] to the channel ID.

According to some embodiments, the step of intercepting push information received by the user according to a probability that the push information is generated based on a normal label of the user comprises: performing interception, if the probability that the push information is generated based on the normal label is lower than a set threshold; and displaying the push information to the user, if the probability that the push information is generated based on the normal label reaches the set threshold.

According to some embodiments, the detection method further comprises a step of updating detection labels of the user according to a change in the normal labels of the user. The step can further comprise: deleting a detection label having a high probability of co-occurrence with a new normal label of the user according to probabilities that the new normal label co-occurs with the existing detection labels; and adding a new detection label for the user, probabilities that the newly added detection label co-occurs with the existing labels of the user being lower than a set threshold.

According to some embodiments, the detection method further comprises: removing a related item of the deleted detection label from the channel index.

According to some embodiments of the present disclosure, label data leakage channel detection apparatuses for detecting a leakage channel of user label data are provided. One exemplary detection apparatus comprises: a detection label adding module configured to add a detection label for a user based on one or more normal labels of the user to generate a user label data set; a channel association module configured to assign a detection label to a given channel according to the user label data set, and establish a channel index associated with a user ID, a detection label and a channel ID; an interception module configured to intercept push information received by the user according to a probability that the push information is generated based on a normal label of the user; an intercepted information analysis module configured to screen the intercepted push information according to a probability that the push information is generated based on a detection label of the user, and add the detection label of the user to a suspected leakage label set if the probability that the push information is generated based on the detection label of the user is higher than a given threshold; a channel searching module configured to search the channel index according to the suspected leakage label set to obtain a corresponding list of suspected leakage channel IDs; and an output module configured to detect whether the push information is from a channel found through the search, deleting the corresponding channel if the push information is from a channel found through the search, and output remaining channels as suspected leakage channels.

According to some embodiments, probabilities that the newly added detection label co-occurs with existing labels of the user are lower than a set threshold, when the detection label adding module adds the detection label for the user based on the one or more normal labels of the user.

According to some embodiments, when assigning a detection label to a given channel according to the user label data set, the channel association module can further perform the following operations: calculating a credibility value of the given channel according to historical behaviors of the given channel; selecting a HASH function from a preset HASH function set by taking a channel ID of the channel as a variable; sampling a user group based on the credibility value of the channel; for each user in the user group obtained through sampling, selecting a detection label corresponding to the channel from detection labels of the user according to the selected HASH function, with a user ID as a variable; and establishing a channel index from [user ID, detection label] to the channel ID.

According to some embodiments, when intercepting push information received by the user according to a probability that the push information is generated based on the normal label of the user, the interception module can further perform the following operation: performing interception if the probability that the push information is generated based on the normal label is lower than a set threshold; and displaying the push information to the user, if the probability that the push information is generated based on the normal label reaches the set threshold.

According to some embodiments, the detection label adding module can be further configured to update detection labels of the user according to a change in the normal labels of the user by: deleting a detection label having a high probability of co-occurrence with a new normal label of the user according to probabilities that the new normal label co-occurs with the existing detection labels; and adding a new detection label for the user, probabilities that the newly added detection label co-occurs with the existing labels of the user being lower than a set threshold.

According to some embodiments, the channel association module can be further configured to remove a related item of the deleted detection label from the channel index.

The present disclosure provides label data leakage channel detection methods and apparatuses. According to some embodiments of the present disclosure, different detection labels can be generated for different data usage channels, based on co-occurrence probabilities of labels for the same user. Usage of the detection labels can be detected, and possible data leakage channels can be effectively detected based on massive data indexing and searching. The technical solutions provided herein provide high detection efficiency, and can process massive and dynamic user label data.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

When a user browses the Internet, a browsed webpage may generate a label indicating the user's preference for the user. A large amount of user preference data represented by labels has been accumulated with the use and development of the Internet. According to some embodiments of the present disclosure, a certain number of detection labels can be added for each user based on normal labels of the user. When push information attributed to the detection labels is found, a leakage channel of user label data can be located according to the push information. The push information can include, for example, advertisements, pushed webpages, and the like. The description below uses push information in the form of advertisements as an example.

Figure 1:
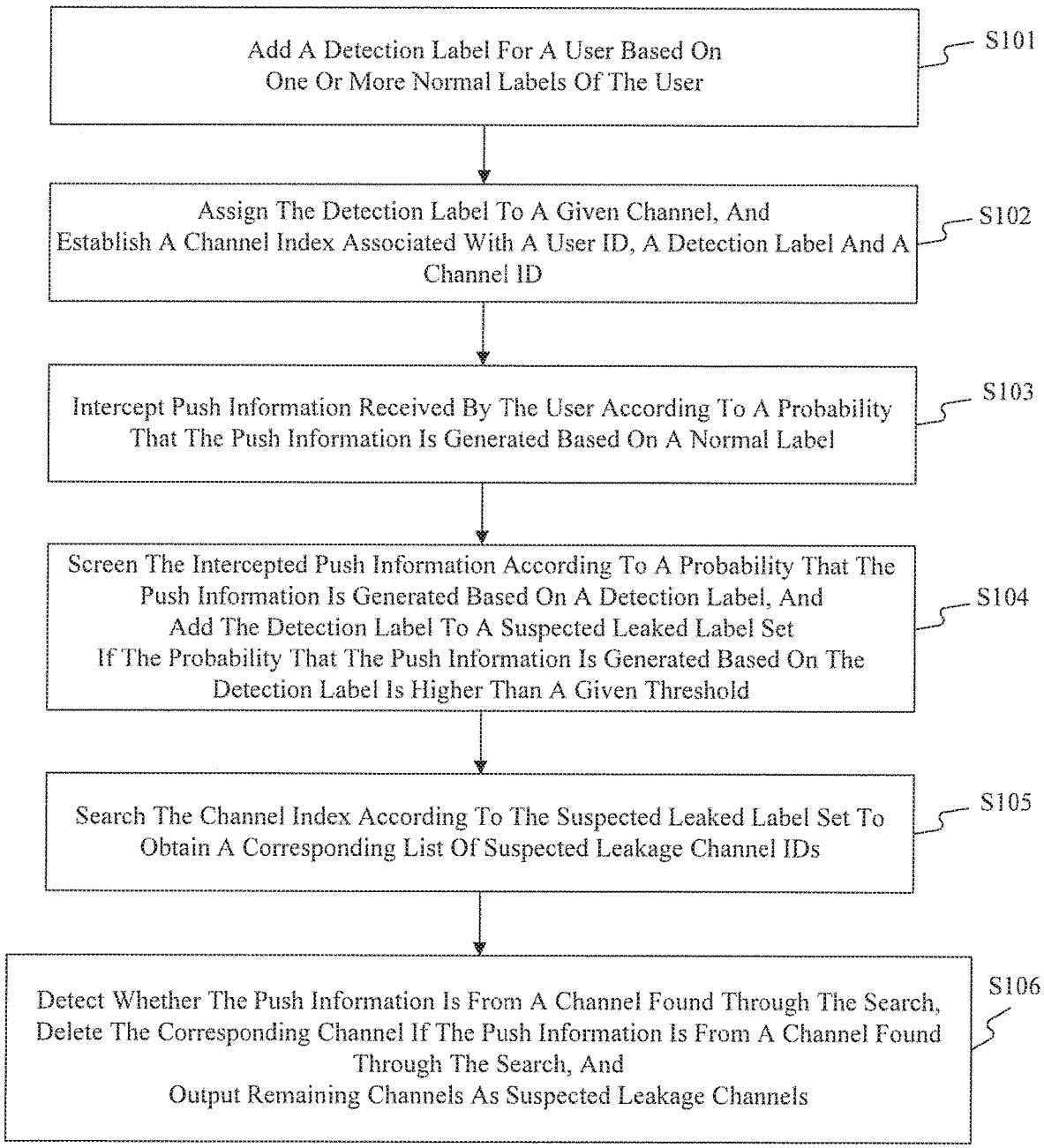
FIG. 1 is a flowchart of an exemplary label data leakage channel detection method according to some embodiments of the present disclosure.

According to some embodiments of the present disclosure, label data leakage channel detection methods are provided. As shown in FIG. 1, one exemplary method comprises the following steps S101-S106.

In step S101, a detection label is added for a user based on one or more normal labels of the user to generate a user label data set. In these embodiments, a normal label refers to a label that is produced from internet surfing by a user and identifies user preference. A detection label refers to a label generated for the user and used for subsequent detection. The detection label does not represent user preference and is only used for leakage detection. The user label data set includes normal labels and detection labels.

To facilitate subsequent analysis, each user may need to have a sufficient number of detection labels to correspond to different channels. In light of this, in some embodiments, if a user does not have enough detection labels, more detection labels can be generated so that the detection labels of the user reach a set number. For example, a user U1 has two normal labels, which are watching TV and junk food respectively. If two detection labels are required in this example, two detection labels can be generated for user U1, which are, for example, vegetable and climbing shoes.

In some embodiments, the detection labels can be generated through the following process: determining whether there is a designated number of detection labels in a user label data set; if the number of detection labels reaches the designated number, ending the generation process; and if the number of detection labels does not reach the designated number, generating a label whose probabilities of co-occurrence with existing labels of the user are lower than a set threshold, and adding the label as a detection label of the user to the user label data set.

When generating a new detection label, a label having low probabilities of co-occurrence with the existing normal labels and existing detection labels of the user may be identified from commonly seen labels. That is, the newly generated detection label is not similar with any existing labels in the user label set. The newly generated detection label and the existing labels are different from each other and have low probabilities of co-occurrence.

In step S102, a detection label is assigned to a given channel according to the user label data set, and a channel index associated with a user ID, a detection label and a channel ID is established.

A credibility value of the given channel can be calculated according to its historical behaviors. In this example, the channel refers to a channel that uses user data. For example, a network platform can provide its user data to an advertiser. The advertiser is a customer of the network platform and is also a channel that uses user data. The credibility value of the channel refers to a credibility value of sending advertisements based on the user data by the channel. If the channel does not push advertisements based on the user data but instead pushes advertisements that a user is not interested in to the user, the channel is not credible. Further, in some embodiments, a unique ID of the channel can be used as a variable key to select a Hash function H1 from a preset Hash function set. A user group can be sampled based on the credibility value of the channel. For a channel with a high credibility, the sampled user group can be smaller. For each user in the sampled user group, a detection label corresponding to the channel can be selected from a detection label set of the user according to the H1 function, with a user ID as a key.

For example, sampled users of a given channel 1 include user U1. A random value can be calculated according to the H1 function and a user ID of user U1. A detection label is selected from all detection labels of user U1 according to the random value and is assigned to channel 1. For example, for channel 1, if the random value calculated according to the H1 function is 1, the first detection label can be selected and assigned to channel 1 according to the order of the detection labels of user U1. In this example, it is assumed that the detection label "vegetable" of user U1 is assigned to channel 1. Similarly, the detection label "climbing shoes" of user U1 can be assigned to a channel 2.

As such, a channel index from [user ID, detection label] to the channel ID can be established. That is, a record is established in the channel index. For example, a channel index as shown in Table 1 can be established:

TABLE 1

| Serial Number | [user ID, detection label] | Channel ID |
|---|---|---|
| 1 | [U1, vegetable] | Channel 1 |
| 2 | [U1, climbing shoes] | Channel 2 |

Detection labels are added to the user label data set, and only one detection label can be assigned to a corresponding channel. For example, [U1, climbing shoes] is assigned to channel 2. If channel 2 pushes advertisements according to the user label data set, the advertisements are considered safe whether they are sent according to a normal label or the detection label indicated in [U1, climbing shoes]. An illegal user may obtain leaked user label data and send advertisements such as climbing shoes to the user through a certain channel. If this channel is not channel 2, as listed in the channel index, it can be determined that user label data is leaked.

In step S103, push information received by the user is intercepted according to a probability that the push information is generated based on a normal label of the user.

Normally, as the terminal for internet surfing is generally on the user side, advertisements received by the user are reflected on the user terminal. Advertisement detection can be first performed by a client on the user terminal. For example, many personal computers and smartphones now have security assistants installed. An existing security assistant can be used to intercept advertisements on the user terminal. A special client can also be developed to detect advertisements on the user terminal. During advertisement interception, an advertisement can be intercepted if a probability that the advertisement is generated based on the normal labels is lower than a set threshold. Alternatively, if a probability that the advertisement is generated based on the normal labels reaches the set threshold, the advertisement can be displayed to the user.

It is appreciated that, if the existing security assistant on the user terminal is used for interception, users not installed with security assistants should be filtered out first in step S102. That is, only users installed with security assistants are sampled, while users not installed with security assistants are not taken into account. In that case, it is unnecessary to develop an additional client, as the security assistants can be used to filter the advertisements on the side of the user terminal.

Based on the above, advertisements received by the user can be filtered. That is, an advertisement received by the user can be intercepted according to a probability that the advertisement is generated based on the normal labels of the user. If the probability that the advertisement is generated based on the normal labels is lower than a set threshold, the next step of processing (step S104 in this example) can be performed. If the probability that the advertisement is generated based on the normal labels reaches the set threshold, the advertisement can be displayed to the user.

It should be appreciated that, the normal labels of the user can be synchronized into the user-side security assistant of the user, so that the security assistant can perform interception according to the probability of the advertisement being generated based on the normal labels. In some embodiments, the probability of the advertisement being generated based on the normal labels can be calculated by the security assistant according to a matching degree between the source of the advertisement and the normal labels of the user. Further, an advertisement whose probability of being generated based on the normal labels is lower than the set threshold can be intercepted and sent to a dedicated back-end server for the subsequent processing.

In step S104, the intercepted push information is screened according to a probability that the push information is generated based on a detection label of the user. The detection label is added to a suspected leakage label set if the probability that the push information is generated based on the detection label is higher than a given threshold.

The advertisement sent to the back-end server can be further screened according to a probability that the advertisement is generated based on a detection label of the user. If a probability that the advertisement is generated based on a certain detection label of the user is higher than a given threshold, the detection label of the user can be added to a suspected leakage label set.

For example, an advertisement of a trekking pole sent to user U1 is sent to the back-end server according to a relatively low probability of the advertisement being generated based on the normal labels "watching TV" and "junk food." However, the probability of the advertisement being generated based on the detection label "climbing shoes" is relatively high. Accordingly, [user U1, climbing shoes] can be added to the suspected leakage label set.

In step S105, the channel index is searched according to the suspected leakage label set to obtain a corresponding list of suspected leakage channel IDs.

Based on the suspected leakage labels in the suspected leakage label set, a search can be conducted in the channel index to obtain a sorted list of possible channel IDs. As in the foregoing example, based on the suspected leakage label indicated in [user U1, climbing shoes], and that detection label of channel 2 in the channel index includes "climbing shoes," channel 2 can be added to a list of suspected leakage channel IDs.

In step S106, it is detected whether the push information is from a channel found through the search. If the push information is from a channel found through the search, the corresponding channel is deleted. The remaining channels are output as suspected leakage channels. As in the above example, it is necessary to detect whether the advertisement source is channel 2. If the source is channel 2, it indicates compliance, and channel 2 can be deleted from the suspected leakage channel list.

The final output channel list includes all possible label data leakage channels. For these channels, more investigation measures can be taken to collect evidence with respect to leakage, such as adding monitored bait (honeypot) data into cooperation data, or combined with offline investigation, and other actions.

Further, as the normal labels of the user are often updated, the detection labels of the user can be updated after the normal labels of the user are updated. In some embodiment, a process of updating the detection labels of the user can be as follows: deleting a detection label having a high probability of co-occurrence with a new normal label of the user according to probabilities that the new normal label co-occurs with the existing detection labels; and adding a new detection label for the user, a probability that the newly added detection label co-occurs with the existing labels of the user being lower than a set threshold.

Correspondingly, the channel index can be updated by removing a related item of the deleted detection label from the channel index. The channel index can be updated, so that a new channel index can be used to detect a suspected leakage channel in the following advertisement interception process.

Figure 2:
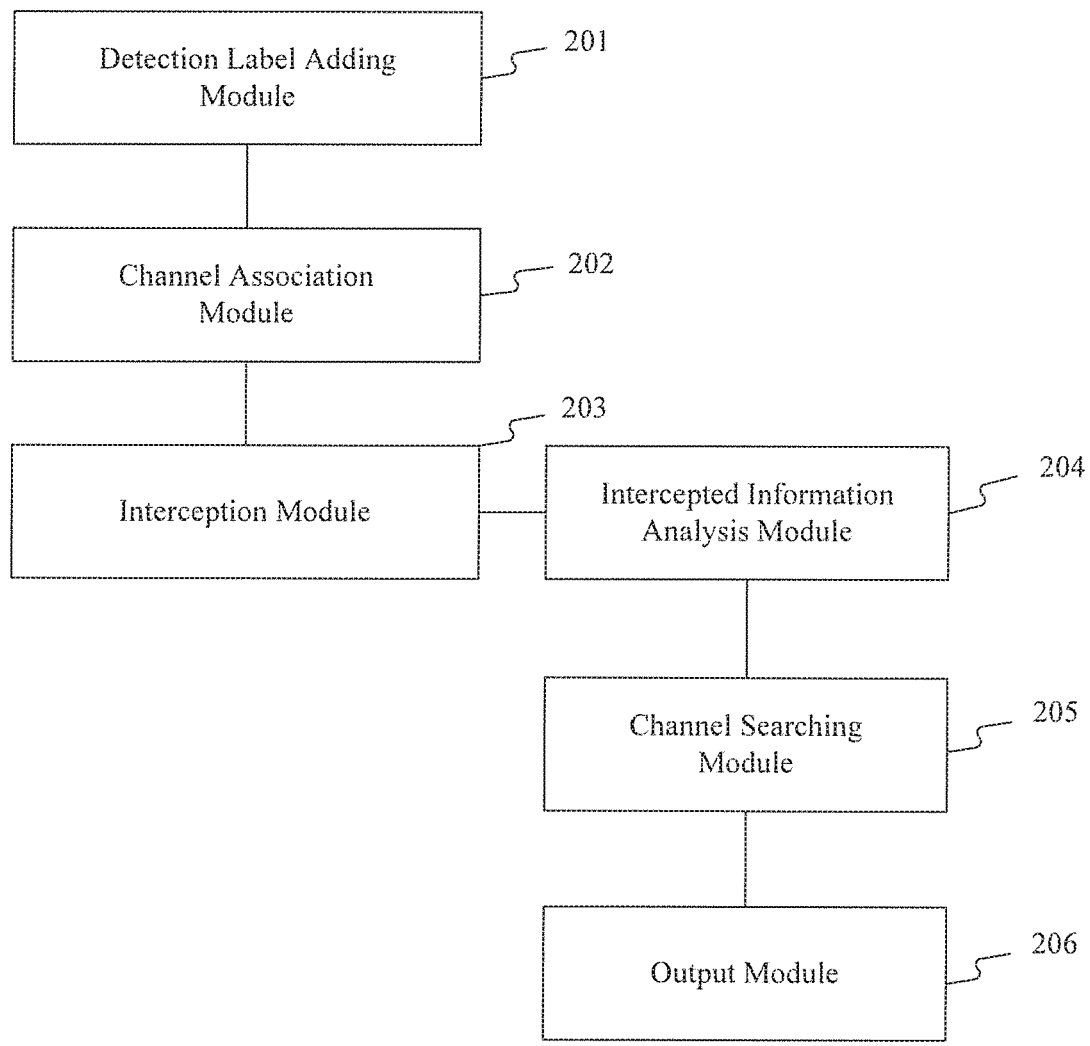
FIG. 2 is a schematic structural diagram of an exemplary label data leakage channel detection apparatus according to some embodiments of the present disclosure.

FIG. 2 is a schematic structural diagram of an exemplary label data leakage channel detection apparatus according to some embodiments of the present disclosure. As shown in FIG. 2, the exemplary detection apparatus 200 includes a detection label adding module 201, a channel association module 202, an interception module 203, an intercepted information analysis module 204, a channel searching module 205, and an output module 206.

Detection label adding module 201 can be configured to add a detection label for a user based on one or more normal labels of the user, to generate a user label data set.

Channel association module 202 can be configured to assign a detection label to a given channel according to the user label data set and to establish a channel index associated with a user ID, a detection label, and a channel ID.

Interception module 203 can be configured to intercept push information received by the user according to a probability that the push information is generated based on a normal label of the user.

Intercepted information analysis module 204 can be configured to screen the intercepted push information according to a probability that the push information is generated based on a detection label of the user. Intercepted information analysis module 204 can further be configured to add the detection label of the user to a suspected leakage label set if the probability that the push information is generated based on the detection label of the user is higher than a given threshold.

Channel searching module 205 can be configured to search the channel index according to the suspected leakage label set to obtain a corresponding list of suspected leakage channel IDs.

Output module 206 can be configured to detect whether the push information is from a channel found through the search. If the push information is from a channel found through the search, output module 206 can further be configured to delete the corresponding channel and to output the remaining channels as suspected leakage channels.

It is appreciated that the above label data leakage channel detection apparatus 200 can be applied to a back-end server of an application system. Interception module 203 can be integrated in a user terminal and perform interception on the side of the user terminal. In some embodiments, interception module 203 can perform interception by using a third-party client, for example, a security assistant or a dedicated client.

In some embodiments, when detection label adding module 201 adds a detection label for the user based on one or more normal labels of the user, probabilities that the added detection label co-occurs with the existing labels of the user are lower than a set threshold. That is, the newly generated detection label is not similar to any existing labels in the user label set. The newly generated detection label and the existing labels are different from each other and have low a probability of co-occurrence, thus not affecting each other.

In some embodiments, when assigning a detection label to a given channel according to the user label data set, channel association module 202 can be configured to perform the following operations: calculating a credibility value of the given channel according to historical behaviors of the given channel; selecting a HASH function from a pre-set HASH function set by taking a channel ID of the channel as a variable; sampling a user group based on the credibility value of the channel; for each user in the user group obtained through sampling, selecting a detection label corresponding to the channel from detection labels of the user according to the selected HASH function, with a user ID as a variable; and establishing a channel index from [user ID, detection label] to the channel ID.

In some embodiments, when intercepting push information received by the user according to a probability that the push information is generated based on a normal label of the user, interception module 203 can perform the following operation: performing interception if the probability that the push information is generated based on the normal label is lower than a set threshold; and if the probability that the push information is generated based on the normal label reaches the set threshold, displaying the push information to the user.

In some embodiments, detection label adding module 201 can be further configured to update detection labels of the user according to a change in the normal labels of the user, by performing the following operations: deleting a detection label having a high probability of co-occurrence with a new normal label of the user according to probabilities of the new normal label co-occurring with the existing detection labels; and adding a new detection label for the user, a probability that the newly added detection label co-occurs with the existing labels of the user being lower than a set threshold.

In some embodiments, channel association module 202 can be further configured to remove a related item of the deleted detection label from the channel index. When the user generates a new normal label, the user label set can be updated in a timely manner.

It is appreciated that the embodiments of the present disclosure may be provided as a method, an apparatus, or a computer program product. For example, one or more of the modules 201-206 as described above with reference to FIG. 2 may be implemented as a hardware embodiment, a software embodiment, or an embodiment combining software and hardware. Moreover, the embodiments of the present disclosure may be in the form of a computer program product implemented on one or more computer usable storage media (including, but not limited to, a magnetic disk memory, a CD-ROM, an optical memory, and the like) including computer-readable program codes therein. The storage media can include a set of instructions for instructing a computer device (which may be a personal computer, a server, a network device, a mobile device, or the like) or a processor to perform a part of the steps of the methods described in the embodiments of the present disclosure. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, cloud storage, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

The above embodiments described herein are merely exemplary. They are not intended to limit the scope of the technical solution provided by the present disclosure. Those skilled in the art can make various changes and modifications without departing from the spirit and the essence of the present disclosure, consistent with the present disclosure. Such changes and modifications shall all be encompassed in the protection scope of the present disclosure, as defined in the appended claims.

The invention claimed is:

1. A leakage channel detection method for detecting a leakage channel of an internet network, the method comprising:
adding one or more detection labels for a user based on a normal label of the user;
generating a random value according to a channel ID of a channel and a user ID of the user;
selecting a detection label from the one or more detection labels of the user based on the random value; and
associating the selected detection label with the channel and the user ID associated with the user, which enables to detect a leakage of user label data over the channel.

2. The leakage channel detection method of claim 1, wherein generating the random value comprises: selecting a Hash function from a preset Hash function set by taking the channel ID of the channel as a variable and generating the random value according to the Hash function.

3. The leakage channel detection method of claim 1, wherein the user is in a user group of the channel that is sampled based on a credibility value of the channel, and the credibility value of the channel is determined according to historical behaviors of the channel.

4. The leakage channel detection method of claim 1, wherein adding the one or more detection labels for the user based on the normal label of the user comprises:
generating the one or more detection labels based on the normal label of the user, a probability of each of the one or more detection labels co-occurring with the normal label being lower than a preset threshold.

5. The leakage channel detection method of claim 1, further comprising:
deleting one detection label among the one or more the detection labels based on a probability of the one detection label co-occurring with a new normal label of the user; and
adding a new detection label for the user based on the new normal label of the user.

6. The leakage channel detection method of claim 1, further comprising:
detecting whether the channel is a suspected leakage channel based on an association level between the selected detection label and information received from the channel.

7. A leakage channel detection apparatus for detecting a leakage channel of an internet network, comprising:
a memory storing a set of instructions; and
one or more processors configured to execute the set of instructions to cause the apparatus to perform:
adding one or more detection labels for a user based on a normal label of the user;
generating a random value according to a channel ID of a channel and a user ID of the user;
selecting a detection label from the one or more detection labels of the user based on the random value; and
associating the selected detection label with the channel and the user ID associated with the user, which enables to detect a leakage of user label data over the channel.

8. The leakage channel detection apparatus of claim 7, wherein generating the random value comprises: selecting a Hash function from a preset Hash function set by taking the channel ID of the channel as a variable and generating the random value according to the Hash function.

9. The leakage channel detection apparatus of claim 7, wherein the user is in a user group of the channel that is sampled based on a credibility value of the channel, and the credibility value of the channel is determined according to historical behaviors of the channel.

10. The leakage channel detection apparatus of claim 7, wherein adding the one or more detection labels for the user based on the normal label of the user comprises:

generating the one or more detection labels based on the normal label of the user, a probability of each of the one or more detection labels co-occurring with the normal label being lower than a preset threshold.

11. The leakage channel detection apparatus of claim 7, wherein the one or more processor is configured to execute the set of instructions to cause the apparatus to further perform:
    deleting one detection label among the one or more the detection labels based on a probability of the one detection label co-occurring with a new normal label of the user; and
    adding a new detection label for the user based on the new normal label of the user.

12. The leakage channel detection apparatus of claim 7, wherein the one or more processor is configured to execute the set of instructions to cause the apparatus to further perform:
    detecting whether the channel is a suspected leakage channel based on an association level between the selected detection label and information received from the channel.

13. A non-transitory computer readable medium that stores a set of instructions that is executable by one or more processors of a computing devices to perform a leakage channel detection method, comprising:
    adding one or more detection labels for a user based on a normal label of the user;
    generating a random value according to a channel ID of a channel and a user ID of the user;
    selecting a detection label from the one or more detection labels of the user based on the random value; and
    associating the selected detection label with the channel and the user ID associated with the user, which enables to detect a leakage of user label data over the channel.

14. The non-transitory computer readable medium of claim 13, wherein generating the random value comprises:
    selecting a Hash function from a preset Hash function set by taking the channel ID of the channel as a variable and generating the random value according to the Hash function.

15. The non-transitory computer readable medium of claim 13, wherein the user is in a user group of the channel that is sampled based on a credibility value of the channel, and the credibility value of the channel is determined according to historical behaviors of the channel.

16. The non-transitory computer readable medium of claim 13, wherein adding the one or more detection labels for the user based on the normal label of the user comprises:
    generating the one or more detection labels based on the normal label of the user, a probability of each of the one or more detection labels co-occurring with the normal label being lower than a preset threshold.

17. The non-transitory computer readable medium of claim 13, wherein the set of instructions that is executable by at least one processor of the computing device to further perform:
    deleting one detection label among the one or more the detection labels based on a probability of the one detection label co-occurring with a new normal label of the user; and
    adding a new detection label for the user based on the new normal label of the user.

18. The non-transitory computer readable medium of claim 13, wherein the set of instructions that is executable by at least one processor of the computing device to further perform:
    detecting whether the channel is a suspected leakage channel based on an association level between the selected detection label and information received from the channel.

* * * * *